US 9,372,526 B2

(12) United States Patent
Bodas et al.

(10) Patent No.: US 9,372,526 B2
(45) Date of Patent: Jun. 21, 2016

(54) MANAGING A POWER STATE OF A PROCESSOR

(71) Applicant: Intel Corporation, Santa Clara, CA (US)

(72) Inventors: Devadatta V. Bodas, Federal Way, WA (US); Eric K. Mann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 13/724,594

(22) Filed: Dec. 21, 2012

(65) Prior Publication Data

US 2014/0181555 A1  Jun. 26, 2014

(51) Int. Cl.
*G06F 1/32* (2006.01)
*G06F 9/48* (2006.01)

(52) U.S. Cl.
CPC .............. *G06F 1/3243* (2013.01); *G06F 1/324* (2013.01); *G06F 9/4812* (2013.01); *Y02B 60/1217* (2013.01); *Y02B 60/1239* (2013.01); *Y02B 60/144* (2013.01)

(58) Field of Classification Search
CPC ..... G06F 1/3243; G06F 1/324; G06F 9/4812; Y02B 60/1217; Y02B 60/1239; Y02B 60/144
See application file for complete search history.

(56) References Cited

U.S. PATENT DOCUMENTS

| 8,276,009 B2* | 9/2012 | King .............................. 713/320 |
|---|---|---|
| 2006/0053326 A1 | 3/2006 | Naveh et al. |
| 2008/0288799 A1 | 11/2008 | Branover et al. |
| 2010/0064154 A1* | 3/2010 | King .............................. 713/320 |
| 2011/0066868 A1 | 3/2011 | Atkinson |
| 2011/0119510 A1 | 5/2011 | Ahn |
| 2012/0102346 A1 | 4/2012 | Haj-Yihia |
| 2012/0159221 A1* | 6/2012 | Guddeti et al. ............... 713/323 |
| 2013/0091369 A1* | 4/2013 | Shih ........................ G06F 1/325 713/323 |

FOREIGN PATENT DOCUMENTS

| CN | 104781756 A | 7/2015 |
|---|---|---|
| DE | 112013006184 T5 | 9/2015 |
| GB | 2523494 A | 8/2015 |
| WO | 2009076079 A2 | 6/2009 |

OTHER PUBLICATIONS

International Search Report for PCT Application No. PCT/US2013/075389, mailed Mar. 14, 2014, 3 pages.

* cited by examiner

*Primary Examiner* — M Elamin
(74) *Attorney, Agent, or Firm* — International IP Law Group, P.L.L.C.

(57) ABSTRACT

A method and system for managing a power state of a processor are described herein. The method includes receiving, at the processor, a signal indicating that an interrupt is to be sent to the processor. The method also includes transitioning the processor from the deep idle state to the shallow idle state in response to receiving the signal and transitioning the processor from the shallow idle state to an active state in response to receiving the interrupt.

21 Claims, 5 Drawing Sheets

100

300

MANAGING A POWER STATE OF A PROCESSOR

TECHNICAL FIELD

The present invention relates generally to managing a power state of a processor. More specifically, the present invention relates to transitioning a processor from a deep idle state to an active state with low latency.

BACKGROUND ART

Power management for a computing device may be controlled by placing components of the computing device in various power states to improve energy efficiency. In some cases, it may be desirable to reduce the power consumption of a component of a computing device. However, this may cause a delay for the handling of workloads by the component. In some prior art, a component may be placed in a low power state and then returned to a higher power state relatively soon thereafter to perform a task. If the component is placed in too low of a power state, it may not be able to return from the power state to service a task within a desired amount of time. However, if the component is not placed in a power state that is low enough, it may consume extra power.

Thus, it may be desirable to determine an appropriate low power state for the component. However, this may be challenging because it is difficult to predict when the component will be returned from the low power state. Consequently, some prior art power management techniques result in the consumption of extra power by not placing a component in a low power state when appropriate to do so. Conversely, some prior art power management techniques result in low component performance by not returning a component from a low power state fast enough to perform a task within a desired amount of time.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
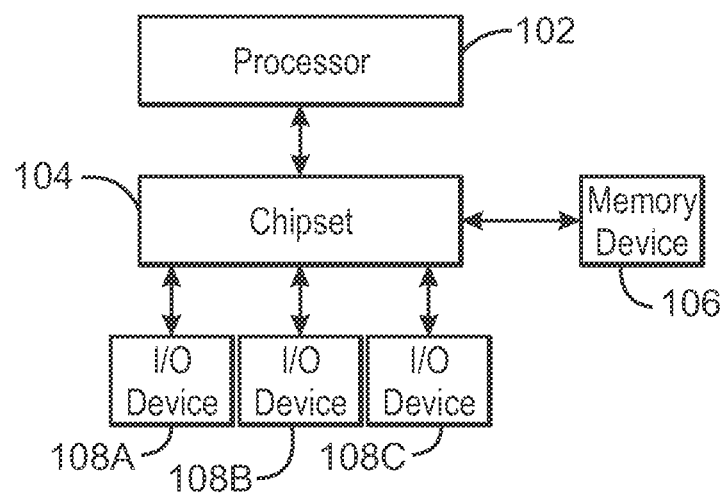
FIG. 1 is a block diagram of a computing device in which the power state management technique described herein may be implemented.

As discussed above, prior art power management techniques may either consume extra power by not placing a component of a computing device in a low power state when appropriate to do so, or may result in low component performance by not returning the component from a low power state fast enough to perform a task within a desired amount of time. Such power management techniques may be especially relevant to processors of computing devices. When the processor of a computing device is not in use, the processor may be placed in a low power or idle state, commonly referred to as a "C-state." There are various types of C-states. Each type of C-state is defined by the power consumption of the processor while the processor is in the specific C-state and the delay, or latency, for entering or exiting from the specific C-state to a regular execution, or active, state, commonly referred to as the "C0-state." For example, when a processor is in a shallow C-state, e.g., the "C1 state," the processor may have a relatively high power consumption but may have a low latency for entering or exiting from the shallow C-state to the active C0-state. In contrast, when a processor is in a deep C-state, e.g., the "C6 state," the processor may have a low power consumption but may have a relatively high latency for entering or exiting from the shallow C-state to the active C0-state.

The exit latency for moving a processor from a deep C-state to the active C0-state may result in delays on the order of tens or, in some cases, hundreds of microseconds for the performance of computations on the processor. Such delays may have a significant impact on the response time and, thus, the overall performance of the processor. Accordingly, embodiments described herein provide a method, system, and machine readable medium for managing a power state of a processor. More specifically, embodiments described herein provide for the transitioning of a processor from a deep C-state, such as the C6 state, to a shallower C-State, such as the C1 state, in response to receiving a signal indicating an impending interrupt from an input/output (I/O) device. This allows the processor to be transitioned from the shallower C-state to the active C0-state much more quickly once the interrupt is actually received at the processor. In various embodiments, transitioning the processor from the deep C-state to the shallow C-state in response to receiving such a signal may provide for a reduction in the exit latency for transitioning the processor to the active C0-state. Furthermore, the use of such a signal provides a deterministic technique for determining when the processor is to be transitioned from the deep C-state to the shallow C-state, resulting in an improvement in performance as compared to current heuristic techniques for making such determinations.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 in which the power state management technique described herein may be implemented. The computing device 100 may be, for example, a desktop computer, laptop computer, server, tablet computer, mobile computing device, or the like. The computing device 100 may include a processor 102 that is adapted to execute stored instructions. The processor 102 can be a single core processor, a multi-core processor, a computing cluster, or any number of other configurations.

The computing device 100 may also include a chipset 104, a memory device 106, and any number of input/output (I/O) devices, such as the I/O devices 108A, 108B, and 108C shown in FIG. 1. The chipset 104 can include one or more integrated circuits or chips that operatively couple the processor 102, the memory device 106, and the I/O devices 108A-C. In some embodiments, the chipset 104 includes controller hubs, such as a memory controller hub to couple with the memory device 106 and an I/O controller hub to couple with the I/O devices 108A-C.

In some embodiments, the chipset 104 is completely or partially integrated into the processor 102. In such embodiments, the memory device 106 and the I/O devices 108A-C may be directly connected to the processor 102.

The chipset 104 may receive transactions generated by the I/O devices 108A-C via links, such as PCI Express (PCIe) links, and may forward the transactions to the memory device 106 or the processor 102, or both. In addition, the chipset 104 may generate and transmit transactions to the memory device 106 and the I/O devices 108A-C on behalf of the processor 102.

The memory device 106 may store data, as well as software instructions that are executable by the processor 102. The memory device 106 can include random access memory (RAM), read only memory (ROM), flash memory, or any other suitable memory systems. For example, the memory device 106 can include DRAM (dynamic RAM) devices, SDRAM (synchronous DRAM) devices, DDR (double data rate) SDRAM devices, or the like.

The processor 102 may manage various resources and processes within the computing device 100. In addition, the processor 102 may execute software instructions, such as the software instructions stored within the memory device 106. The processor 102 may interface with the chipset 104 to transfer data to the memory device 106 and/or the I/O devices 108A-C.

According to embodiments described herein, the processor 102 supports low power or idle states. For example, the processor 102 may support a C1-state, C2-state, C3-state, C4-state, C5-state, C6-state, or other C-states, as defined either by a power management specification such as versions of the Advanced Configuration and Power Interface (ACPI) specification. Moreover, idle states that are supported by the processor 102 may also be defined by any other specification, or may not be part of any industry specification.

In various embodiments, the processor 102 also supports power state management. More specifically, the processor 102 supports transitions from a deep idle state to a shallow idle state or active state, or vice versa, according to the techniques described herein.

It is to be understood that the block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
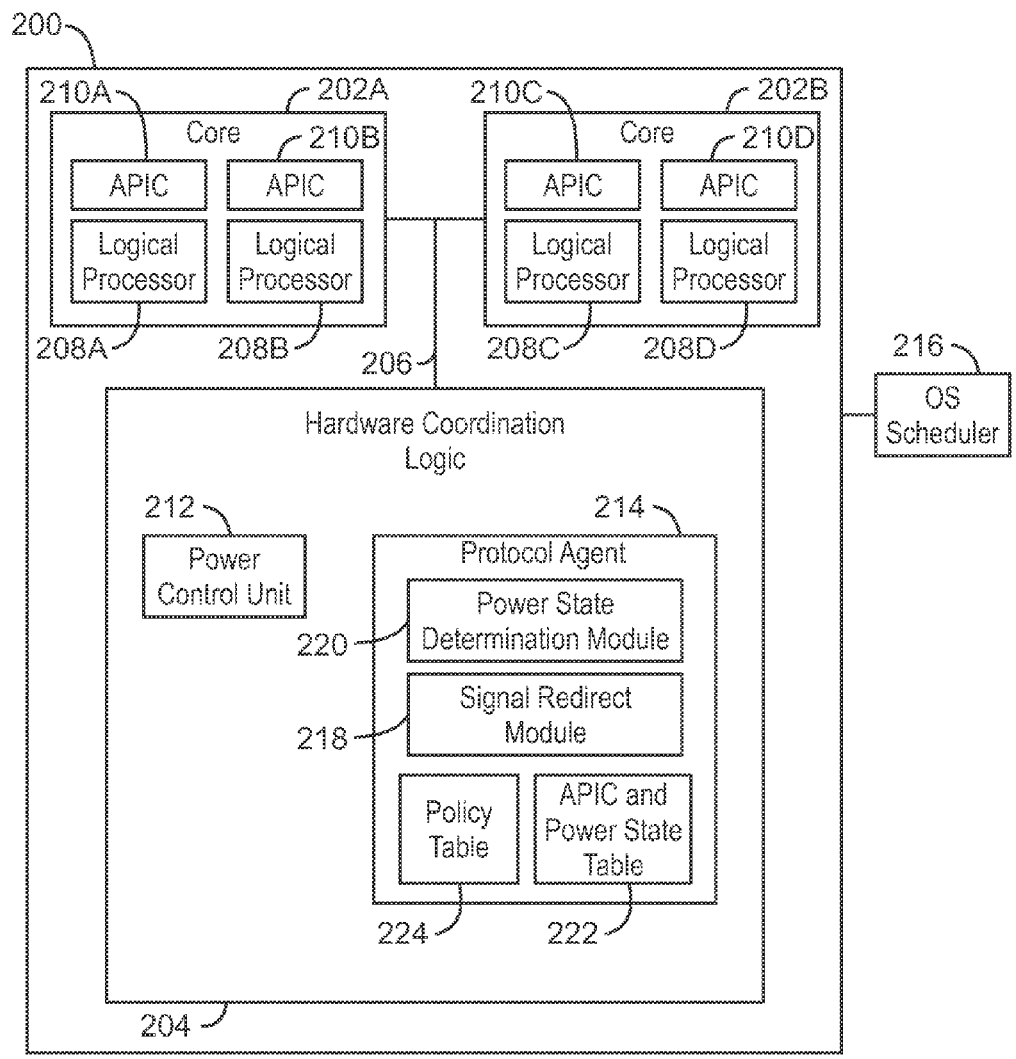
FIG. 2 is a block diagram of a multi-core processor for which the power state management technique described herein may be implemented.

FIG. 2 is a block diagram of a multi-core processor 200 for which the power state management technique described herein may be implemented. The multi-core processor 200 of FIG. 2 may be an embodiment of the processor 102 that is implemented within the computing device 100 discussed with respect to FIG. 1. The multi-core processor 200 may include a single integrated circuit that includes two or more processing units, or "cores," such as cores 202A and 202B shown in FIG. 2. The multi-core processor 200 may also include hardware coordination logic 204 and a bus 206 for carrying instructions and data among the components of the multi-core processor 200.

Each core 202A-B may include logic for executing instructions, as well as any number of dedicated resources, such as a private cache and/or registers, for identifying each respective core 202A-B. In some embodiments, each core 202A-B has exclusive access to a portion of a system memory of the computing device in which the multi-core processor 200 is implemented. In addition, the cores 202A-B may include any number of shared resources.

In some embodiments, each core 202A-B is capable of multi-threading operations, e.g., executing two or more parallel sets of operations or threads in two or more logical processors 208A-D. Each logical processor 208A-D may have uniquely associated with it an interrupt controller such as an advanced programmable interrupt controller (APIC) 210A-D for handling interrupts that may be assigned to the logical processor 208A-D. The functionality of each APIC 210A-D may be implemented using technologies known in the art such as the XAPIC architecture by Intel Corporation, although other interrupt technologies may also be used. Each APIC 210A-D or, alternatively, each logical processor 208A-D may have an identification, logical address, or APIC logical identification (ID), which may be constructed of a cluster ID and an agent ID. The cluster ID may include an identifier that is common to a group of logical processors 208A-D.

Each logical processor 208A-D may be assigned uniquely to a cluster according to a policy set by, for example, the operating system (OS) of the computing device. Such a policy may set a specific size for each cluster such as, for example, 4, 8, or 16 logical processors. To enable redirectable (or unassigned) interrupts, it may be desirable to ensure that each cluster includes logical processors from at least two cores. One mechanism for accomplishing this may be to size clusters such that the number of logical processors in each cluster exceeds the number of logical processors in each core. For example, in a computing device with two logical processors per core, a cluster size may be set at 4. Logical processors may be assigned to a cluster, for example, sequentially beginning with a first core. According to this technique, once all logical processors of the first core are assigned, the logical processors of the second core are also assigned. Alternatively, logical processors may be assigned to a cluster to perform a given task or support an application. In addition, for a computing device that includes multiple processors, a cluster may include only the logical processors of a single processor package.

The agent ID for each APIC 210A-D may be used to identify the APIC 210A-D within a cluster or other group. In some embodiments, although a number of APICs may have the same agent ID, their complete logical addresses may be unique because each APIC may be assigned to only one cluster. Other addressing schemes for identifying APICs and their associated logical processors may also be used.

In some embodiments, a redirectable or lowest priority interrupt may target a cluster or group of logical processors from two or more cores, and may include a mask or set of addressing bits. For example, a lowest priority interrupt may include a bit mask that may indicate which agent IDs, e.g., logical processors, within a cluster can handle the interrupt, wherein a logic value, e.g., "1" or "0," may indicate whether or not the corresponding logical processor is a valid target for the interrupt. The agent IDs capable of handling the interrupt may be identified within the mask by, for example, setting appropriate bits within the mask. Other techniques for identifying agent IDs may also be used. Furthermore, in some embodiments, a redirectable interrupt may be used to identify at least on agent ID as an allowed target for the redirectable interrupt.

Each core 202A-B within the multi-core processor 200 may be able to operate in two or more power states. Operating in multiple power states may allow a computing device to reduce or eliminate performance impacts of hitting the thermal envelope or the voltage envelope, as well as minimize the degradation of battery life. Reducing energy consumption may have other benefits as well.

Although other descriptions or standards for defining power states may be used, the power states described herein may be referred to as C-states. Such C-states may be defined in versions of the ACPI specification, such as, for example, ACPI Specification Rev. 3.0, Sep. 2, 2004, and may be adapted to, for example, Intel Core Duo or other Intel multi-core processor architectures. As used herein, the C0-state may be a fully active power state of a core. The C1-state may be a low-latency idle state in which a core maintains cache coherence. The C2-C6 states may be idle states for which various parameters that affect the power consumption of the core have been increasingly adjusted. Deeper or lower power states, such as the C-5 state or C6-state, have a higher penalty in terms of exit latency for transitioning the core to the active C0-state than shallower or higher power states, such as the C1-state or C2-state. Additionally, the deeper a power state is, the more energy is spent entering and exiting the power state. Therefore, the cost of waking a core for handling an interrupt is higher for deeper power states. Furthermore, any number of additional C-states may be specified according to embodiments described herein, such as the C7-C9 states.

As discussed above, a deeper or lower power state takes longer to exit than a shallower or higher power state. The longer transition may affect overall processor performance and ability to service interrupts in a timely manner. As a result, multi-core processors may limit or preclude cores from operating in deep power states. However, limiting exit latency by avoiding deeper power states may result in higher power consumption, lower energy efficiency, and lower battery life. As used herein, higher or lower are relative terms describing the relative power consumption or ordering of power states.

Because of the differing impacts of core transitions on different measures of processor state and performance, prioritization for redirection may be affected by the assignment policy being implemented. For example, assignment may be based on a policy of conserving power consumption, lowering interrupt latency, increasing performance, or the like.

In some embodiments, the logical processors 208A-D of each core 202A-B may also operate in different power states or activity levels as requested by the respective logical processor 208A-D. Such power states may be referred to as logical processor (LP) C-states. According to one nomenclature, a higher index such as an LP C2-state, an LP C3-state, or the like, indicates a deeper idle state. Further, in various embodiments, the power state of each core 202A-B may be determined to be the lowest, e.g., least idle, LP C-state of all of its logical processors 208A-D. For example, a core with two logical processors, one in an LP C0-state and one in an LP C2-state, may be considered to be in the LP C0-state.

In embodiments in which each core 202A-B includes two or more logical processors 208A-D, there may be further impacts on performance for consideration in assigning a redirectable interrupt. Because the logical processors 208A-D of any given core 202A-B may share core resources, changes in the state of one logical processor may affect another logical processor. Thus, it may be desirable to evaluate the appropriateness of a logical processor for assignment based on several factors, such as, for example, logical processor activity factor, power wake up penalty, and interrupt matching.

An example having two or more cores 202A-B with two logical processors 208A-D each may be illustrative for showing some possible performance tradeoffs. A configuration of one such core wherein one logical processor is active and the other logical processor is idle may yield a maximum performance with minimal power impact, depending on the assignment policy. In a situation with one core that is active and one core that is idle, and a policy that is antagonistic with respect to power and interrupt latency, the interrupt may be assigned to the idle core. On the other hand, in the same situation with a policy of minimizing interrupt latency, the interrupt may be assigned to the active core. Further, to prepare for a subsequent interrupt, the idle core may be demoted.

In some embodiments, a combined power state level (CPSL) or other composite rating or evaluation of a core may be determined, possibly in addition to other power state levels. This score or rating may be used in evaluating a core's appropriateness for targeting an interrupt. Once calculated, a CPSL may then be assigned a rating or raking according to a pre-determined interrupt targeting policy. In some embodiments, the CPSL or composite rating for a given core may be calculated using the core's power state, activity, or power state for each of the core's logical processors, power wake up penalty, and an indication of interrupt matching for each of the core's logical processors. The CPSL may be determined by combining a rating, e.g., a power state, activity state, wake up penalty, availability, load, or the like, of each processor. The interrupt matching may be determined by the cluster and which agent IDs are targeted in an interrupt. Any logical processor (and associated agent ID) that is identified in an interrupt as an allowable target may be considered as a match. The resulting CPSL may then factor in or combine the number of matches, logical processor states, and/or other indicators of a core's power state.

In some embodiments, the CPSL may vary according to the number of logical processors, the number of logical processors per core, and the performance criteria being used. Further, the impacts of state changes of a given logical processor on other logical processors in the same multi-core processor may also affect the scoring.

The hardware coordination logic 204 of the multi-core processor 200 may include components that coordinate and control the operation of the cores 202A-B. For example, in various embodiments, the hardware coordination logic 204 includes a power control unit (PCU) 212 and a protocol agent 214. The hardware coordination logic 204 may also work in conjunction with other components of the computing device, such as an OS scheduler 216.

The OS scheduler 216 may be responsible for scheduling tasks to the multi-core processor 200, and may be a hardware or software component of the computing device. For example, the OS scheduler 216 may be a component of the computing device's OS software. In addition, the OS scheduler 216 may allocate tasks to each core 202A-B within the multi-core processor 200.

In various embodiments, the PCU 212 of the hardware coordination logic 204 includes logic and components for regulating the power state of the cores 202A-B. As such, the PCU 212 may monitor and manage the C-state or other power level of each core 202A-B, as well as the logical processors 208A-D associated with each core 202A-B. The PCU 212 may also determine and effect the transitions of the cores 202A-B and the logical processors 208A-D to and from the C-states or other power levels. Alternatively, a logical processor 208A-D may request a specific C-state. However, the multi-core processor's actual C-state may be the lowest requested C-state of all cores 202A-B within the multi-core processor 200.

Transitioning between different C-states or other power states may be accomplished by, for example, varying the clock operating frequency or voltage of an operating core 202A-B, adjusting the cache states, and/or switching the components of a core 202A-B on and off. The PCU 212 may issue commands, for example, over the bus 206, to each core 202A-B or logical processor 208A-D for these transitions. In addition, the PCU 212 may receive data from each core 202A-B or logical processor 208A-D, such as, for example, temperature, clock speed, or other status indicators.

The PCU 212 may further include logic for determining what power saving features to activate for each core 202A-B or logical processor 208A-D and the timing of such activations. Such logic and other functions of the PCU 212 may utilize inputs from other components of the multi-core processor 200, such as, for example, the protocol agent 214.

Using such inputs, the PCU 212 may generate requests to demote either core 202A-B to a lower C-state, such as the C1-state, or promote either core 202A-B to a higher C-state, such the C6-state.

Although the PCU 212 is shown in FIG. 2 as an on-die component of the multi-core processor 200, the PCU 212 may also be located elsewhere in the computing device or be part of another component of the computing device. Locating the PCU 212 or some of its components off-die may be desirable, for example, in multi-core multi-processor computing devices in which clusters are defined across a number of multi-core processors.

The protocol agent 214 may include software or hardware for managing how signals are assigned within the multi-core processor 200, as well as managing the power state of each core 202A-B based on such signals. Specifically, the protocol agent 214 may include a signal redirect module 218 configured to receive a signal, referred to herein as a "snooze signal," from another device or component, such as an I/O device or a device that is connected to the multi-core processor 200 via the bus 206. For example, in some embodiments, the snooze signal is sent to the signal redirect module 218 of the multi-core processor 200 via a bus mastering technique in which a direct memory access (DMA) controller enables a device connected to the bus 206 to initiate transactions for the multi-core processor 200.

In various embodiments, the snooze signal may indicate that an interrupt is pending, e.g., is about to be sent to the multi-core processor 200 by the device or component. The signal redirect module 218 may then determine the appropriate core 202A-B to which the snooze signal applies, and may forward such information to a power state determination module 220. The power state determination module 220 may determine an appropriate power state for the core 202A-B, as well as a suitable time and method by which the core 202A-B will be transitioned to the determined power state, based on the snooze signal. The power state determination module 220 may then forward such information to the PCU 212, which may coordinate and control the changes in the power state of the core 202A-D. Further, the signal redirect module 218 may also be configured to receive the interrupt for which the snooze signal was generated, and assign the interrupt to the appropriate core 202A-B.

In various embodiments, the power state determination module 220 may direct the PCU 212 to prepare the core 202A-B for a transition from a deep idle state to a shallower idle state in response to the snooze signal. For example, the power state determination module 220 may direct the PCU 212 to prepare the core 202A-B for a transition from the C6-state to the C1-state. This may be accomplished by, for example, varying the clock operating frequency or voltage of the core 202A-B, adjusting the cache states, switching the components of the core 202A-B on and off, or performing any number of other techniques. Then, the PCU 212 may then complete the transition to the active C0-state once the interrupt is actually received from the I/O device. Such a power state management technique may allow for a reduction in the exit latency for transitioning from the deep idle state to the active state. For example, such techniques may reduce the exit latency by 20 microseconds or more. Therefore, when the actual interrupt is received at the multi-core processor 200, the delay for processing the interrupt may be as low as 1-2 microseconds.

In some embodiments, the protocol agent 214 also includes an APIC and power state table 222 and a policy table 224. The signal redirect module 218 may use the APIC and power state table 222 and the policy table 224 to perform some of the tasks associated with assigning interrupts.

It is to be understood that the block diagram of FIG. 2 is not intended to indicate that the multi-core processor 200 is to include all of the components shown in FIG. 2. Further, the multi-core processor 200 may include any number of additional components not shown in FIG. 2, depending on the details of the specific implementation.

According to embodiments described herein, a processor may be slowly transitioned from the active C0-state to a deep idle state, such as the C6-state, via a delayed deep C-state (DDCS) technique. According to the DDCS technique, the processor may first transition from the C0-state to the C1-state. If no interrupts have been received after a specified amount of time, e.g., a specified delay, the processor may then transition from the C1-state to the C2-state. This process may continue until the processor reaches the C6-state. In this manner, the processor may be prevented from entering a deep idle state for cases in which the actual period of time spent in the idle state is short.

Figure 3:
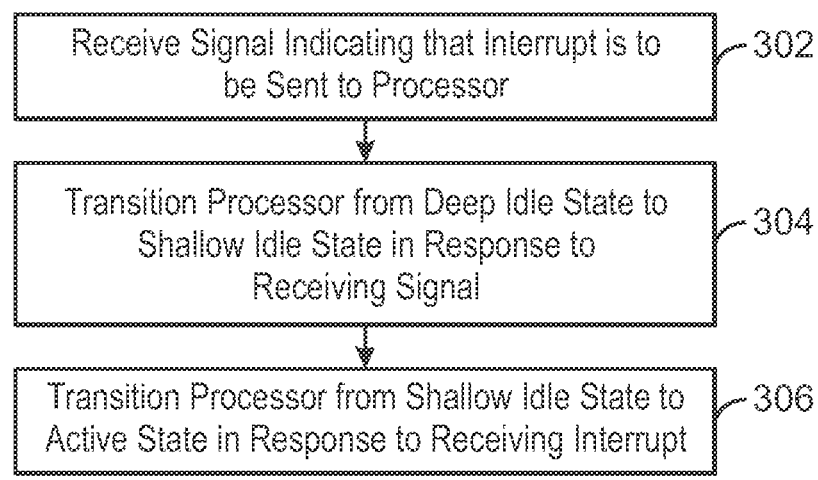
FIG. 3 is a process flow diagram of a method for managing a power state of a processor.

FIG. 3 is a process flow diagram of a method 300 for managing a power state of a processor. More specifically, the method 300 is directed to managing a transition of the processor from a deep idle state to an active state. In various embodiments, the method 300 is implemented in a manner that allows the processor to exit from the deep idle state and enter the active state with a relatively low latency.

The method 300 may be implemented by a computing device, such as the computing device 100 discussed with respect to FIG. 1. Moreover, the method 300 may be implemented by any suitable computing device including a processor, such as the processor 102 within the computing device 100 or the multi-core processor 200 discussed with respect to FIG. 2.

The method 300 begins at block 302, at which the processor receives a signal indicating that an interrupt is to be sent to the processor at some point in the future, e.g., after a specified amount of time. The signal may be referred to as a "snooze signal," as discussed further below with respect to FIG. 4. The signal may be received from an I/O device. In various embodiments, the I/O device is configured to delay delivery of the signal based on a delay for delivery of the actual interrupt. For example, in some embodiments, the interrupt is delayed according to a DMA coalescing procedure. In such embodiments, it may be desirable to delay delivery of the signal until delivery of the actual interrupt is about to occur. Furthermore, the signal may be received from a device that is connected to the processor via a data bus. Such a device may send the signal to the processor according to a bus mastering technique, for example.

At block 304, in response to receiving the signal, the processor transitions from a deep idle state to a shallow idle state. This may be accomplished by increasing an operating frequency of the processor's clock, increasing the processor's voltage, switching on any of the components of the processor, or the like. Further, in some embodiments, such operations involve progressively transitioning the processor from the initial deep C-state to the shallow C-state by transitioning the processor through each C-state that is between the initial deep C-state and the shallow C-state. For example, the processor may be transitioned from the C6-state to the C5-state and, after a specified delay, from the C5-state to the C4-state. This process may be repeated until the processor reaches the C1-state, for example.

At block 306, the processor transitions from the shallow idle state to the active state in response to receiving the actual interrupt at the processor. In various embodiments, the processor transitions from the deep idle state the shallow idle state such that the processor is ready to enter the active state with minimal exit latency once the interrupt is received.

It is to be understood that the process flow diagram of FIG. 3 is not intended to indicate the steps of the method 300 are to be executed in any particular order, or that all of the steps of the method 300 are to be included in every case. Further, any number of additional steps may be included within the method 300, depending on the details of the specific implementation.

In various embodiments, the processor includes a multi-core processor within a server, for example. When the multi-core processor receives the signal, the multi-core processor may determine whether the signal corresponds to an assigned interrupt or an unassigned interrupt. If the signal corresponds to an assigned interrupt, the multi-core processor may route the signal to the core specified by the interrupt. However, if the signal corresponds to an unassigned (or redirectable) interrupt, the multi-core processor may determine a specified core to which the interrupt is to be sent and route the interrupt to the specified core. The specified core may be configured to prepare for the transition from the deep idle state to the shallow idle state in response to receiving the signal, and then complete the transition to the active state once the actual interrupt is received.

Figure 4:
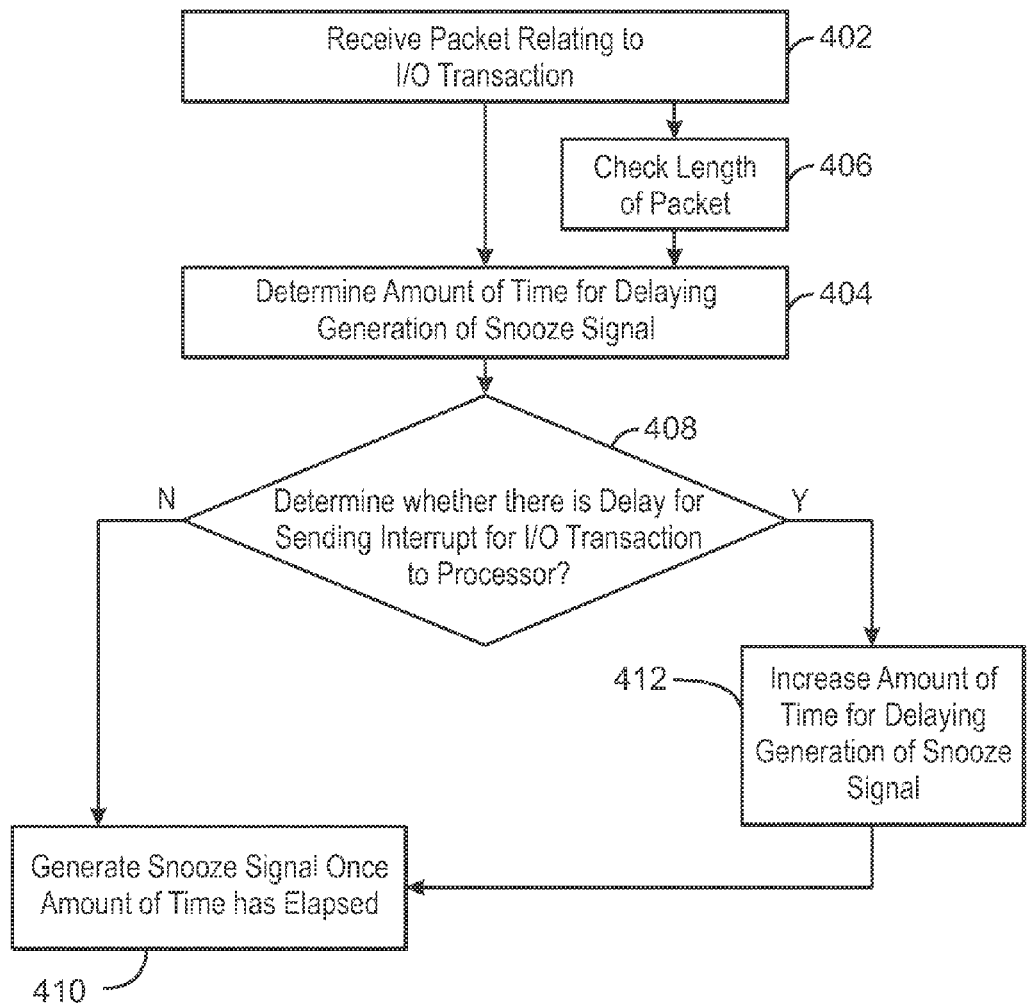
FIG. 4 is a process flow diagram of a method for determining when to generate a snooze signal via an input/output (I/O) device.

FIG. 4 is a process flow diagram of a method 400 for determining when to generate a snooze signal via an I/O device. The I/O device may be any suitable type of computing device that is capable of sending interrupts relating to I/O transactions to a processor. For example, the I/O device may be a computing device that is communicably coupled to the processor via an external connection, or a computing device that is communicably coupled to the processor via an internal data bus.

The method begins at block 402, at which the I/O device receives a packet relating to an I/O transaction. The packet may be received via a network or another computing device, and may include data or status condition information, for example.

At block 404, an amount of time for delaying generation of a snooze signal is determined. The amount of time for delaying generation of the snooze signal may be determined based on a time at which the interrupt for the I/O transaction is to be delivered to the processor. Further, in some cases, a length of the packet is checked at block 406 and is used to determine the amount of time for delaying generation of the snooze signal at block 404.

At block 408, it is determined whether there is a delay for sending the interrupt for the I/O transaction to the processor. If there is no delay for sending the interrupt to the processor, the method 300 proceeds to block 410. At block 410, the snooze signal is generated and sent to the processor once the determined amount of time has elapsed.

Alternatively, if there is a delay for sending the interrupt to the processor, the method 300 continues at block 412. At block 412, the amount of time for delaying generation of the snooze signal is increased according to the delay for sending the interrupt to the processor. The snooze signal is then generated and sent to the processor at block 410 once the increased amount of time has elapsed.

In various embodiments, the interrupt may be delayed according to a DMA coalescing procedure. According to the DMA coalescing procedure, the interrupt may be buffered for a specified interval of time. The DMA coalescing procedure may allow for a reduction in the power consumption of the processor by allowing the packet to be sent directly to the memory of the computing device. In this manner, the processor may receive interrupts less frequently and, thus, may remain in an idle state for a longer period of time.

Further, in various embodiments, the snooze signal is generated as an embedded hint within the packet itself. For example, the snooze signal may be embedded as a TLP processing hint (TPH) for a PCI header. Such embodiments may reduce the total number of signals that are sent from the I/O device to the processor, thus reducing the overall cost of the power state management technique described herein.

It is to be understood that the process flow diagram of FIG. 4 is not intended to indicate the steps of the method 400 are to executed in any particular order, or that all of the steps of the method 400 are to be included in every case. Further, any number of additional steps may be included within the method 400, depending on the details of the specific implementation.

Figure 5:
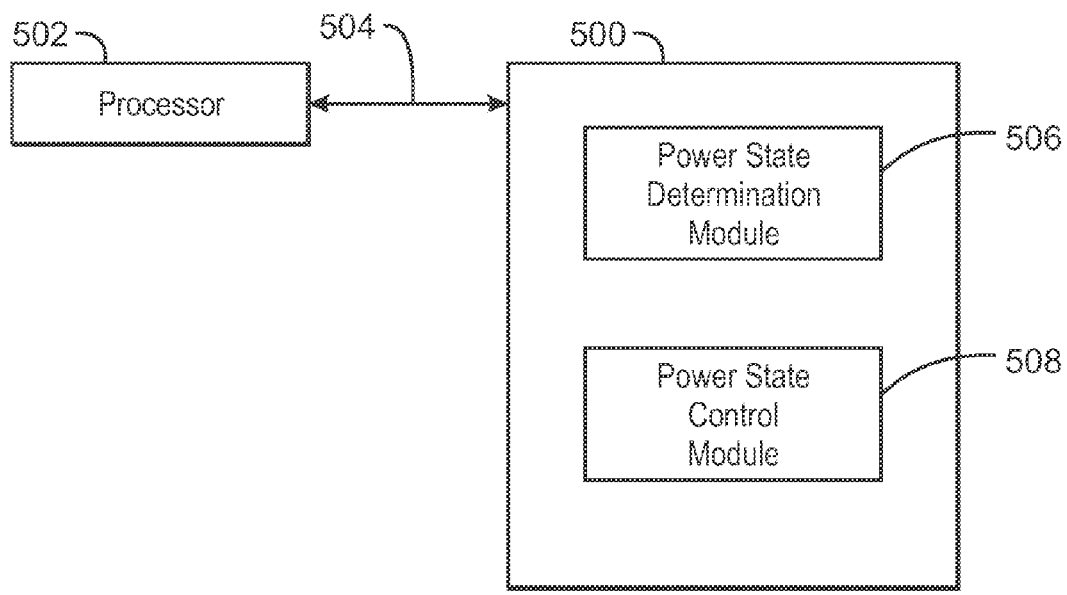
FIG. 5 is a block diagram showing a tangible, non-transitory computer-readable medium that stores code for managing a power state of a processor.

FIG. 5 is a block diagram showing a tangible, non-transitory computer-readable medium 500 that stores code for managing a power state of a processor. The tangible, non-transitory computer-readable medium 500 may be accessed by a processor 502 over a computer bus 504. Furthermore, the tangible, non-transitory, computer-readable medium 500 may include code configured to direct the processor 502 to perform the methods described herein.

The various software components discussed herein may be stored on the tangible, computer-readable medium 500, as indicated in FIG. 5. For example, a power state determination module 506 may be configured to determine a suitable power state for a processor of a computing device. Specifically, the power state determination module 506 may determine that the processor is to be transitioned from a deep idle state, such as a C6-state, to the shallow idle state, such as the C1-state, in response to receiving a signal indicating an impending interrupt from a device, such as an I/O device. In addition, a power state control module 508 may be configured to manage the power state of the processor. Specifically, the power state control module 508 may transition the processor from the deep idle state to the shallow idle state in response to receiving instructions from the power state determination module 506. Further, the power state control module 508 may complete the transition of the processor from the shallow idle state to the active state in response to receiving the actual interrupt from the device. In this manner, the power state determination module 506 and the power state control module 508 may provide for a reduction in the exit latency for transitioning the processor from the deep idle state to the active state, thus increasing the performance of the processor.

It is to be understood that the block diagram of FIG. 5 is not intended to indicate that the tangible, non-transitory computer-readable medium 500 is to include all of the components shown in FIG. 5. Further, any number of additional components not shown in FIG. 5 may be included within the tangible, non-transitory computer-readable medium 500, depending on the details of the specific implementation.

EXAMPLE 1

A method for managing a power state of a processor is provided herein. The method includes receiving, at the processor, a signal indicating that an interrupt is to be sent to the processor. The method also includes transitioning the processor from the deep idle state to the shallow idle state in response to receiving the signal and transitioning the processor from the shallow idle state to an active state in response to receiving the interrupt.

The method may include transitioning the processor from the deep idle state to the shallow idle state such that the processor can be transitioned to the active state with a low latency once the interrupt is received at the processor. The method may also include transitioning the processor from the deep idle state to the shallow idle state by increasing an operating frequency of a clock of the processor, switching on any of a plurality of components of the processor, or increasing a voltage of the processor, or any combinations thereof.

The method may include determining that the processor is to be moved from the active state to the deep idle state when the processor is idle for a specified period of time. The method may also include transitioning the processor to the shallow idle state and, if the processor is still idle after a specified delay, transitioning the processor from the shallow idle state to the deep idle state.

The method may include receiving the signal from an input/output device. The input/output device may be configured to delay delivery of the signal based on a delay for delivery of the interrupt. The method may further include receiving, at a specified core of a multi-core processor, a signal indicating that an interrupt is to be sent to the specified core and, in response to receiving the signal, transitioning the specified core from the deep idle state to the shallow idle state. The method may also include transitioning the specified core from the shallow idle state to the active state in response to receiving the interrupt.

Transitioning the processor from the deep idle state to the shallow idle state may include transitioning the processor from the deep idle state to a first shallow idle state. Then, the processor may be transitioned from the first shallow idle to a second shallow idle state after a specified delay, wherein the second shallow idle state is a shallower idle state than the first shallow idle state.

EXAMPLE 2

A system for managing a power state of a processor is provided herein. The system includes a processor that is configured to execute stored instructions and a storage device that stores instructions. The storage device includes processor executable code that, when executed by the processor, is configured to receive a signal indicating that an interrupt is impending, transition the processor from a deep idle state to a shallow idle state in response to receiving the signal, and transition the processor from the shallow idle state to an active state in response to receiving the interrupt. The system also includes a device that is communicably coupled to the processor and is configured to send the signal indicating that the interrupt is impending to the processor and send the interrupt to the processor.

The system may include a server, and the process may include a multi-core processor. The storage device may include processor executable code that, when executed by a specified core of the multi-core processor, is configured to receive a signal indicating that an interrupt is impending and transition the specified core from the deep idle state to the shallow idle state in response to receiving the signal. The processor executable code may also be configured to transition the specified core from the shallow idle state to the active state in response to receiving the interrupt. The multi-core processor may be configured to determine the specified core to which the interrupt is to be sent and route the signal indicating that the interrupt is impending to the specified core.

The device may be configured to delay sending the signal for a specified amount of time, wherein the specified amount of time is determined based on a delay for sending the interrupt. The device may include an input/output device. Alternatively, the device may include a device that is connected to the processor via a data bus. The device may send the signal to the processor according to a bus mastering technique.

The processor executable code may be configured to transition the processor from the deep idle state to the shallow idle state by increasing an operating frequency of a clock of the processor, switching on any of a plurality of components of the processor, or increasing a voltage of the processor, or any combinations thereof. The processor executable code may also be configured to transition the processor from the deep idle state to the shallow idle state such that the processor can be transitioned to the active state with a low latency once the interrupt is received at the processor. Furthermore, the signal may indicate that the interrupt will be sent to the processor after a specified amount of time.

The processor executable code may be configured to transition the processor from the deep idle state to the shallow idle state by transitioning the processor from the deep idle state to a first shallow idle state and transitioning the processor from the first shallow idle to a second shallow idle state after a specified delay. In such embodiments, the second shallow idle state is a shallower idle state than the first shallow idle state.

EXAMPLE 3

At least one machine readable medium is provided herein. The machine readable medium includes instructions stored therein that, in response to being executed on a processor, cause the processor to receive a signal indicating that an interrupt is to be sent to the processor and, in response to receiving the signal, transition the processor from a deep idle state to a shallow idle state. The instructions also cause the processor to transition the processor from the shallow idle state to an active state in response to receiving the interrupt.

The instructions may cause the processor to determine that the processor is to be moved from the active state to the deep idle state when the processor is idle for a specified period of time. The instructions may also cause the processor to transition the processor to the shallow idle state and, if the processor is still idle after a specified delay, transition the processor from the shallow idle state to the deep idle state. Furthermore, the signal may indicate that the interrupt is to be sent to the processor after a specified amount of time, and the instructions may cause the processor to transition the processor from the deep idle state to the shallow idle state such that the processor can be transitioned to the active state with a low latency once the interrupt is received. In addition, the instructions may cause the processor to transition the processor from the deep idle state to the shallow idle state by progressively transitioning the processor through each of a number of idle states that are between the deep idle state and the shallow idle state.

EXAMPLE 4

A device for sending a signal indicating an impending interrupt to a processor is provided herein. The device is configured to generate a signal indicating that an interrupt is to be sent to a processor of a system and determine a delay for sending the signal to the processor based on a delay for sending the interrupt to the processor. The device is also configured to send the signal to the processor after the delay for sending the signal has elapsed and send the interrupt to the processor after the delay for sending the interrupt has elapsed.

The device may be an input/output device. The delay for sending the interrupt may correspond to a direct memory access (DMA) coalescing procedure in which the interrupt is buffered for a specified interval of time. The delay for sending the signal may be less than the delay for sending the interrupt. Furthermore, the delay for sending the signal may be determined such that the signal is sent to the processor a specified amount of time before the delay for sending the interrupt has elapsed.

The device may reside outside the system and be communicably coupled to the processor via an external connection. Alternatively, the device may reside within the system and be communicably coupled to the processor via an internal data bus.

EXAMPLE 5

A method for sending a signal indicating an impending interrupt to a processor is provided herein. The method includes generating a signal indicating that an interrupt is to be sent to a processor and determining a delay for sending the signal to the processor based on a delay for sending the interrupt to the processor, wherein the delay for sending the signal is less than the delay for sending the interrupt. The method also includes sending the signal to the processor after the delay for sending the signal has elapsed and sending the interrupt to the processor after the delay for sending the interrupt has elapsed.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A device for sending a signal indicating an impending interrupt to a processor, wherein the device is configured to:
    generate a signal indicating that an interrupt is to be sent to a processor of a system;
    determine a delay for sending the signal to the processor based on a delay for sending the interrupt to the processor, wherein the delay for sending the interrupt to the processor corresponds to a direct memory access (DMA) coalescing procedure in which the interrupt is buffered for a specified interval of time;
    send the signal to the processor after the delay for sending the signal has elapsed; and
    send the interrupt to the processor after the delay for sending the interrupt has elapsed.

2. The device of claim 1, wherein the device comprises an input/output device.

3. The device of claim 1, wherein the delay for sending the signal is less than the delay for sending the interrupt.

4. The device of claim 3, wherein the delay for sending the signal is determined such that the signal is sent to the processor a specified amount of time before the delay for sending the interrupt has elapsed.

5. The device of claim 1, wherein the device resides outside the system and is communicably coupled to the processor via an external connection.

6. The device of claim 1, wherein the device resides within the system and is communicably coupled to the processor via an internal data bus.

7. A method for sending a signal indicating an impending interrupt to a processor, comprising:
- generating a signal indicating that an interrupt is to be sent to a processor;
- determining a delay for sending the signal to the processor based on a delay for sending the interrupt to the processor, wherein the delay for sending the interrupt to the processor corresponds to a direct memory access (DMA) coalescing procedure in which the interrupt is buffered for a specified interval of time, and wherein the delay for sending the signal is less than the delay for sending the interrupt;
- sending the signal to the processor after the delay for sending the signal has elapsed; and
- sending the interrupt to the processor after the delay for sending the interrupt has elapsed.

8. The method of claim 7, wherein generating the signal and sending the signal are performed by an input/output device.

9. The method of claim 8, wherein the input/output device resides outside the system and is communicably coupled to the processor via an external connection.

10. The method of claim 8, wherein the input/output device resides within the system and is communicably coupled to the processor via an internal data bus.

11. The method of claim 7, wherein the delay for sending the signal is less than the delay for sending the interrupt.

12. The method of claim 7, wherein the delay for sending the signal is determined such that the signal is sent to the processor a specified amount of time before the delay for sending the interrupt has elapsed.

13. At least one non-transitory machine readable medium having instructions stored therein that, in response to being executed by a controller, cause the controller to:
- generate a signal indicating that an interrupt is to be sent to a processor;
- determine a delay for sending the signal to the processor based on a delay for sending the interrupt to the processor, wherein the delay for sending the interrupt to the processor corresponds to a direct memory access (DMA) coalescing procedure in which the interrupt is buffered for a specified interval of time, and wherein the delay for sending the signal is less than the delay for sending the interrupt;
- send the signal to the processor after the delay for sending the signal has elapsed; and
- send the interrupt to the processor after the delay for sending the interrupt has elapsed.

14. The machine readable medium of claim 13, wherein the controller is a controller for an input/output device.

15. The machine readable medium of claim 14, wherein the input/output device resides outside the system and is communicably coupled to the processor via an external connection.

16. The machine readable medium of claim 14, wherein the input/output device resides within the system and is communicably coupled to the processor via an internal data bus.

17. The machine readable medium of claim 13, wherein the delay for sending the signal is less than the delay for sending the interrupt.

18. The machine readable medium of claim 13, wherein the delay for sending the signal is determined such that the signal is sent to the processor a specified amount of time before the delay for sending the interrupt has elapsed.

19. The device of claim 1, wherein the signal is to cause the processor to transition to a new power state.

20. The method of claim 7, wherein the signal is to cause the processor to transition to a new power state.

21. The machine readable medium of claim 13, wherein the signal is to cause the processor to transition to a new power state.

* * * * *